US006503026B1

(12) United States Patent
Mitchell

(10) Patent No.: US 6,503,026 B1
(45) Date of Patent: Jan. 7, 2003

(54) STATIC FREE METHOD FOR BLOWING LOOSE FILL INSULATION

(75) Inventor: Randall Kevin Mitchell, Salt Lake County, UT (US)

(73) Assignee: Redi-Therm Insulation, Inc., Salt Lake City, UT (US)

( * ) Notice: Subject to any disclaimer, the term of this patent is extended or adjusted under 35 U.S.C. 154(b) by 494 days.

(21) Appl. No.: 08/928,287

(22) Filed: Sep. 12, 1997

(51) Int. Cl.[7] ........................ B65G 53/46; B65G 53/36; B65G 53/54; B65G 53/66

(52) U.S. Cl. ..................... 406/128; 406/124; 52/742.13

(58) Field of Search ........................... 52/742.1, 742.13, 52/742.11, 741.3; 406/96, 97, 98, 99, 100, 102, 124, 128

(56) References Cited

U.S. PATENT DOCUMENTS

| | | | | |
|---|---|---|---|---|
| 323,317 A | | 7/1885 | Goodrich et al. | |
| 1,920,889 A | | 8/1933 | Pullen | 175/264 |
| 2,193,036 A | | 3/1940 | McGraw | 221/84 |
| 2,341,360 A | | 2/1944 | Bulgin | 154/44 |
| 2,839,339 A | | 7/1958 | Mills | 302/66 |
| 3,030,152 A | | 4/1962 | Hoshina | 302/14 |
| 3,166,688 A | | 1/1965 | Rowand et al. | 317/2 |
| 3,290,426 A | | 12/1966 | Barrentine | 174/47 |
| 3,473,087 A | | 10/1969 | Slade | 317/2 |
| 3,963,856 A | | 6/1976 | Carlson et al. | 174/47 |
| 4,121,624 A | | 10/1978 | Chen | 138/122 |
| 4,149,755 A | * | 4/1979 | Handleman et al. | 406/90 |
| 4,167,235 A | * | 9/1979 | Green | 406/135 |
| 4,224,965 A | | 9/1980 | Suchor | 138/154 |
| 4,246,306 A | | 1/1981 | Payne et al. | 428/36 |
| 4,303,457 A | | 12/1981 | Johansen et al. | 156/149 |
| 4,697,300 A | | 10/1987 | Warlop | 15/327 R |
| 4,773,960 A | | 9/1988 | Vincelli et al. | 156/357 |
| 4,866,565 A | | 9/1989 | Wray, Jr. | 361/215 |
| 4,870,535 A | | 9/1989 | Matsumoto | 361/215 |
| 5,081,326 A | | 1/1992 | Usui | 174/47 |
| 5,150,499 A | | 9/1992 | Berfield | 15/327.1 |
| 5,666,780 A | * | 9/1997 | Romes et al. | 52/742.13 |

* cited by examiner

*Primary Examiner*—Michael Safavi
(74) *Attorney, Agent, or Firm*—James L. Sonntag; Parsons Behle & Latimer

(57) ABSTRACT

An apparatus and method for installing blown installation where insulation is entrained in a stream of air and is blown through an electrostatic dissipating hose. The hose contains an electrically conductive and grounded element to dissipate the static charges built up in the entrained insulation passing through the hose and exiting the hose for application into a selected space.

3 Claims, 2 Drawing Sheets

STATIC FREE METHOD FOR BLOWING LOOSE FILL INSULATION

RELATED APPLICATIONS (Not applicable)

STATEMENT REGARDING FEDERALLY SPONSORED RESEARCH OR DEVELOPMENT (Not applicable)

FIELD OF THE INVENTION

This invention relates to a method and apparatus for applying blown insulation.

BACKGROUND OF THE INVENTION

A common method of applying insulation into cavities, such as attic spaces and the like, is to blow the insulation into place. This type of insulation is generally known as blown or loose fill insulation. Typical loose fill insulation materials are usually fibrous materials, such as fiberglass, cellulose, rockwool, or the like.

To apply loose fill insulation, the insulation material is loaded into a hopper. The material is mechanically agitated, and by means of air pressure is blown through a flexible hose manufactured of plastic, such as a urethane, polyethylene, vinyl, or the like. The hose is usually between 2 and 4 inches in diameter and frequently 100 feet or longer in length. The installer, by manipulating the direction of the end of the hose, lofts the insulation into the proper areas to the desired depth and density for the purpose of sound and thermal insulation. This insulation is quite effective, particularly in flat spaces, and has superior insulation properties because there are no voids or gaps, as frequently found with rolled insulation materials.

Although loose-fill insulation has superior insulation properties, it has several problems, mostly associated with the installation of the insulation. The insulation, after it is blown, tends to settle and decrease in thickness over time. It is known that the blown insulation, particularly for cellulosic materials, forms an unstable matrix that settles into a stable and more dense matrix over time. Therefore, a major problem is that the operator must compensate for the settling, a calculation that is made difficult by the uncertainty of determining how much any given applied layer of insulation will settle, and how long it will take to settle to its equilibrium. An insulation installer must install the proper thickness calculated as settled inches, as most manufactures only rate the insulation value at settled inches and not installed inches. If the installer underestimates the settling, the thickness, of the insulation will eventually settle to a depth below specification and the insulating value of the insulation will be inadequate for that specified. Settling can be as much as 15 to 20%, and therefore is a significant problem. The large extent, the uncertainty and the variability of the settling process has mitigated against any standard for as-installed blown insulation, and it is a continuing dilemma for insulation installers who wish to guarantee a settled insulation thickness.

In response to this problem, methods have been proposed to accelerate or eliminate settling. In U.S. Pat. No. 4,773,960 to Vincelli et al. it is proposed to coat the insulation material with a dry deactivated adhesive. Water is injected into the hose as the material is blown through it, which moistens the fiber particles and activates the adhesive. The applied insulation then sets, which reduces settling with time. The problem with this method is that it involves treating the insulation material with a dry-adhesive additive that adds cost to the material and may increase its density. After installation, there is still an initial settling of up to about 10%. In addition, in a humid environment, the adhesive material may activate during storage. Further, the use of water complicates the installation apparatus and introduces more possibilities of equipment corrosion. In certain climates the water lines and pumps are subject to damage by freezing. It is also frequent that a construction site have no water, which requires the construction crews to bring their own water.

There are other problems associated with blown insulation. With conventional dry blown systems the fibers disperse wildly as they exit the hose, which can cause extreme dust problems, even to the degree that the installer may be unable to see the insulation as he is applying it, which complicates his ability to lay a layer of the proper depth. This combined with the settling problem results in an uneven layer of insulation with inadequate R-rating. In addition, the dispersed fibers tend to be attracted and adhere to wooden structural members, where they cannot function as insulation.

Yet, another problem is that when the dry loose-fill insulation is blown through a plastic hose, the hose becomes statically charged as the particles of insulation are blown through the hose. The static charges in the hose subject the operator to frequent and strong static shocks whenever he contacts any grounded surface, such as plumbing, or an air duct, etc.

OBJECTS OF THE INVENTION

It is, therefore, an object of the invention to provide an apparatus and method of installing blown insulation that decreases settling of as-blown insulation material.

Another object of the invention is to provide an as-blown insulation material in a stable matrix with minimal settling after installation.

Another object of the invention is an apparatus and method for increasing the control of the application of blown insulation by, decreasing air-born dust and improving visibility.

Another object of the invention is an apparatus and method for applying blown insulation that minimized the amount of insulation material that uselessly sticks to framing members and surrounding wooden structures.

Another object of the invention is to provide an apparatus and method for applying blown insulation in which static shocks to the operator are eliminated.

Another object of the invention is to provide an apparatus and method for applying blown insulation in which the static charges in the insulation fibers and the application hose are dissipated.

Further objects of the invention will become evident in the description below.

BRIEF SUMMARY OF THE INVENTION

It has been unexpectedly found in development of the present invention to eliminate shock to the operator that a major factor contributing to settling is the static charge created when the insulation material is blown through a plastic hose. It is believed that since each fiber has the same charge, they repel each other and form an unstable matrix when initially blown. Eventually, the static charges dissipate allowing the fibers to settle into a more stable and more dense settled matrix. Since the dissipation of the static charge is determined by numerous uncontrollable and variable factors, the rate and extent of settling of such blown insulation material has remained unpredictable. It has been found that the static charge in conventionally blown cellulosic insulation can lead to more than 40% of the total settling.

Accordingly, in the practice of the invention, preventing the build-up of static charge in the fibers as they leave the hose has substantially reduced the settling problem. It has been found that by blowing the insulation material through a grounded electrically conductive hose to dissipate any static charge, the total settling of the as-blown insulation is reduced by up to 40%, or more. The as-blown insulation material forms a more stable, static-free matrix, without the addition of water and adhesives.

It has also been found that practice of the invention will substantially reduce the air-borne dust problem. It has been found that a significant factor in the dispersion of dust is the static build-up in the fiber particles. Elimination of the static charge in the hose dissipates static charges in the particles and substantially reduces air-born dust. In addition, the tendency of the fiber to adhere to wooden structural members is also significantly reduced. With the reduction of dust and the fiber adhering to structural members, the installer can easily monitor the depth of the applied fiber. Accordingly, the applied fiber is applied more evenly, and the insulated area is much cleaner.

An unexpected benefit from practice of the present invention, is that friction of the fiber passing through the hose is significantly reduced. This allows for a faster application rate for a given hose diameter and hose length. This not only decreases the application time, but reduces the work load on the blowers, leading to power savings and cooler operating temperatures for the blower.

In summary, the dissipation of static charges in the blowing hose to reduce static shock to the operator also achieves unexpected and surprising advantages. The settling of the applied insulation is significantly reduced, air-born dust is minimized, insulation adhering to the structural members is significantly decreased, and the rate of application is increased. Application of the insulation is more predictable and even. This is due to the reduction of settling, the better visibility of the operator, and the reduction the insulation adhering to structural members. The level of comfort of the operator is materially increased by the reduction in dust level and the absence of static shocks when he touches a ground. Operator efficiency is increased because he can with greater ease apply an even insulation layer at a faster application rate. The invention is of particular advantage for cellulosic insulation materials, since the settling problem is more pronounced for these materials. Settling in conventionally blown fiber-glass insulation materials is less than for cellulosic, so the unexpected advantage of reduced settling is less pronounced. The other advantages would still be unexpected, i.e., eliminating shock to the operator, the advantages of reduced dust, faster application rate, reduced scattering and less attraction to framing.

In summary, the present invention is an apparatus for blowing insulation material into the space to be insulated which comprises;

blower for creating a stream of air, shopper and feeder structure for mechanically agitating and controllably introducing insulation material into the stream of air, a flexible hose attached to the feed structure/blower assembly at a proximate end through which the stream of air with entrained insulating material is directed and exits through a distal outlet end of the hose, the hose comprising a grounded conductor disposed at or near the outlet end to dissipate electrical charge and provide an essentially charge-free stream of entrained insulation material leaving the outlet distal end.

Another aspect of the invention is a method for blowing insulation material into a space to form a dry, static-free matrix of blown insulation material which comprises;

entraining the insulation in a stream of air and directing the entrained insulation through a flexible hose having a proximate inlet end and a distal outlet end, dissipating static charges by providing an grounded electrical conductor at or near the outlet end sufficient to provide a static free stream of entrained insulation material exiting the outlet end, directing the outlet end to direct the static free stream of insulation material into the space to be insulated.

DETAILED DESCRIPTION OF THE INVENTION

Figure 1:
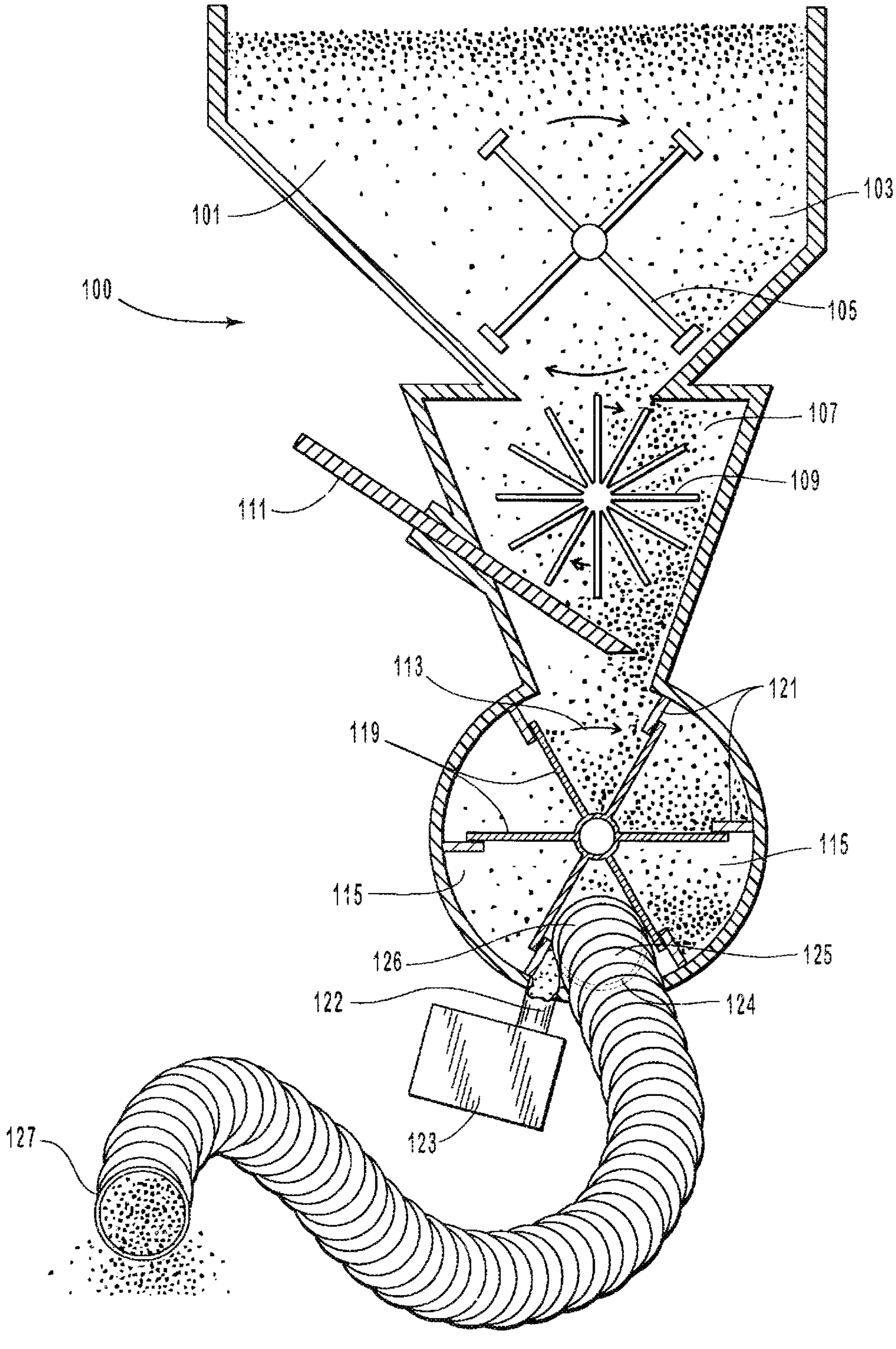
FIG. 1 is a schematic view of an insulation blowing apparatus

Reference is now made to FIG. 1, which is a schematic of a typical apparatus 100 for applying blown insulation. Insulation material 101 is placed into a hopper 103 with a primary agitator 105 to loosen the material sufficiently to flow from the hopper. The insulation material flows from the hopper 103 into a material conditioning chamber 107 that includes a secondary agitator 109 that further loosens the material and breaks up agglomerated fibers. An adjustable gate 111 controls flow of the material from the conditioning chamber into the airlock chamber 113. The airlock chamber 113 is cylindrical in shape and includes internal rotating vanes 119 with seals 121 at the ends of the vanes to create rotating chambers 115 that successively come in registration with a blower outlet 122, and the hose inlet or proximal end 126 to the hose 125. This system allows the insulation material to be metered at a controlled rate into the air stream. A blower 123 blows air through a blower outlet 122 while each of the rotating chambers come in turn into registration with the blower outlet 122. As a rotating chamber 115 rotates into registration with the blower outlet 122, the insulation therein is caught up into the air stream and carried out through the hose 125. The hose 125 is manufactured of a flexible material and attached to the blower at its proximate or inlet end 126 by an appropriate attachment 124. The operator grasps the distal or output end 127 of the hose and directs the insulation material as flows from the output end for application. The hose is typically between 100 and 150 feet long, but may be shorter or longer.

The apparatus of the invention is designed to dissipate static charge in the insulation material before it exits the output end 127 of the hose 125. This is accomplished by dissipating static charges in the hose at least at or near the output end 127, which also dissipates charges in the insulation material 101 passing through the hose 125. Preferably, charges are dissipated along the entire length of the hose to gain the maximum benefit and improvement to the air flow properties in the hose.

Figure 2A:
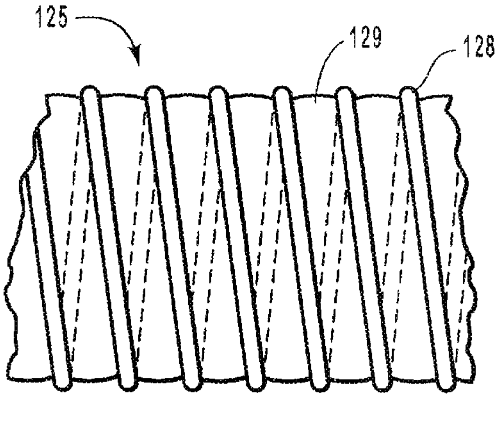
FIGS. 2A to 2B are diagrams of hoses for used in the apparatus of the invention.
Figure 2B:
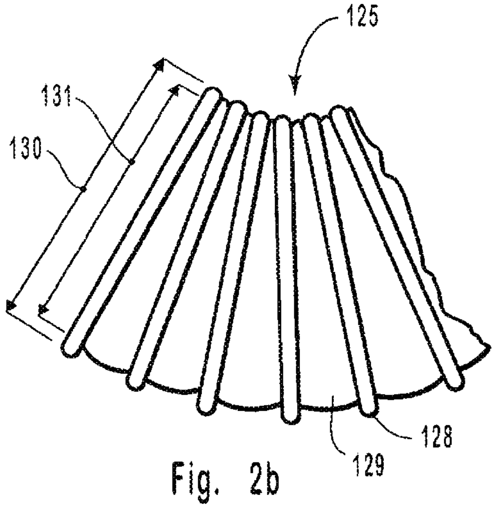

Reference in now also made to FIGS. 2A and 2B. The charge is preferably dissipated by providing a hose 125 that has an electrical conductor extending along its entire length. In the preferred embodiment, illustrated in FIG. 2A, the hose comprises a support in the form of a flexible frame 128 that supports a hose of an electrically conductive flexible film 129. The flexible frame is preferably in the form of a helix as illustrated in FIG. 2A, but may also be separate circular hoop, or any other suitable construction. The film 129 is preferably a carbon impregnated plastic film, but may any material that is electrically conductive and has the necessary durability, abrasion and heat resistance, and flexibility to function with an insulation blower, which requires that the hose be dragged through attic spaces and over structural members and be able to withstand abrasion and heat from the insulation material flowing in the hose. Suitable materials include metal foils, and plastic films lined with metal foil, plastic and films impregnated with metal or carbon powders, or materials imbedded with metal or carbon strands, fibers, or wires.

The frame material may be any material with sufficient strength and flexibility to support the film hose. In the preferred hose as illustrated in FIG. 2A, the hose 125 is constructed with a helical frame 128 of a flexible plastic, such as polyethylene, polypropylene, or the like. The hose may also be of suitable metals, carbon fiber composite, or other like materials. If the frame is of a conductive material, and if, as in the case of a helix, it provides a continuous conductive path along its length, the supported hose film may then be a non-conductive plastic. Preferably, the frame supports the film hose at the exterior of the hose to provide a smooth flow path in the interior of the hose. The frame is preferably also of a material that does not leave marks on surfaces over which it is drug. Accordingly, certain materials with carbon black are not preferred.

As illustrated in FIG. 2B, the preferred hose comprises a film hose or tube 129 supported at the interior circumference of a helical frame 128 of high density polyethylene. The outer diameter of the helical frame 130 is greater than the diameter of the folds in the film 131 when the hose is flexed to its tightest radius, as illustrated in FIG. 2B. This is to protect and minimize abrasion to the more fragile film hose and increase durability of the hose in the installation environment. The film of the inner hose is preferably a carbon impregnated plastic film, such as the film available under the name APEX CO-31™, by TEKNOR APEX.

Figure 3A:
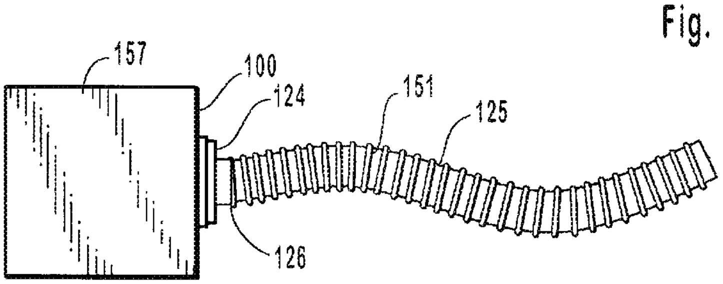
FIGS. 3A to 3D are schematic views of hoses that may be used in practice of the invention.

An object of the invention is to provide a hose that has a grounded conductor at or near the output end. This can be achieved by various hose constructions as illustrated in FIGS. 3A to 3D. In FIG. 3A the hose 125 has a conductive portion 151 extending for its entire length. The conductive portion 151 can be attached to a ground 157 through the attachment 124 of the hose 125 to the blowing apparatus 100.

Figure 3B:
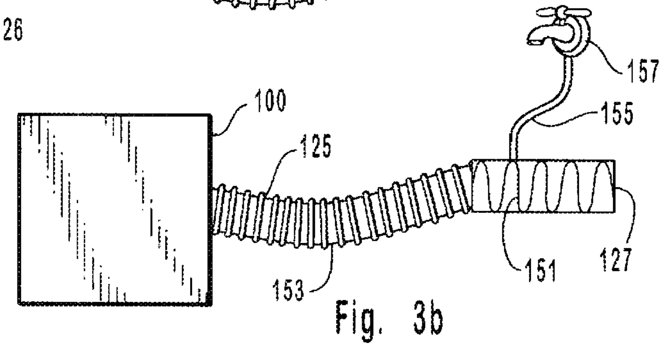

In FIG. 3B, the hose 125 comprises a conductive portion 151 at its outlet end 127 and a non-conductive portion 153 at its inlet end. In this embodiment the conductive portion 151 is grounded separately, such through a wire or strap 155 attached to an appropriate ground 157. The conductive portions of the hoses of FIGS. 3A and 3B may be of any suitable construction, such as that described above. In the embodiment of FIG. 3B, the conductive portion 151 may be a rigid construction, such as a metal sleeve, with the required flexibility for application being provided solely by the non-conductive portion 153. The nonconductive portion 153 may be of conventional hose construction.

Figure 3C:
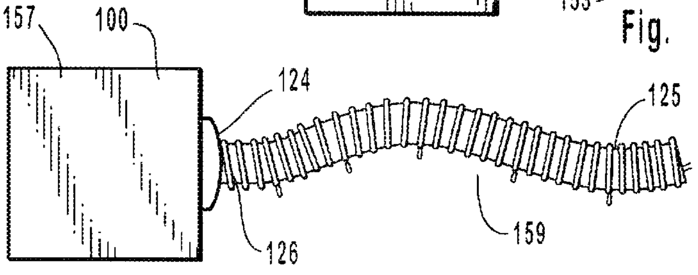
Figure 3D:
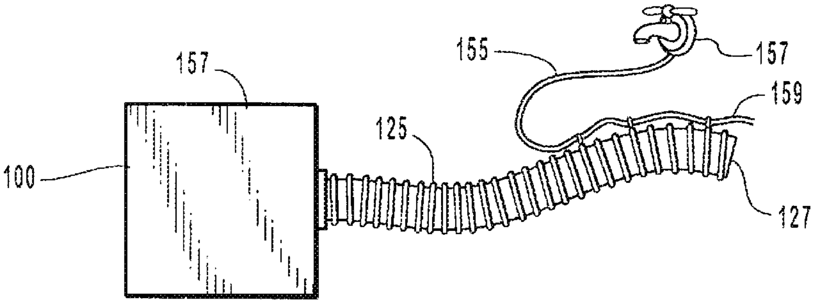

An alternate hose construction is shown in FIGS. 3C and 3D. An electrical conductor 159, such as a metal wire or strap can be extended along the entire length of the hose 125, as in FIG. 3C or along a portion at the outlet end 127, as in FIG. 3D. The strap 159 is attached to a ground 157 through the attachment 124 to the blowing apparatus 100 at the inlet end 126, as in FIG. 3C. Alternately, the strap 159 may be attached to a ground 157 by means of a grounding wire 155, as in FIG. 3D. The conductor may be secured to the hose at spaced intervals, e.g. every foot or so. In this embodiment the conductor is preferably along the exterior of the hose, as interior wires or straps tend to impede the flowing insulation material and cause clogging. The hose 125 may be of conductive or nonconductive construction.

Preferably a static-dissipating conducting portion extends along the entire length of the hose, as FIGS. 3A and 3C, but only the portion of the hose at or near the output end need be conductive to dissipate static charge in the stream of entrained insulation and achieve advantages of the invention, as in FIGS. 3B and 3D. This may be achieved by joining a non-conductive hose at the proximate input end to a conductive hose at the distal output end, or by attaching a rigid or flexible metal sleeve at the output end. These embodiments are less preferred because a separate ground must be provided for the conductive portion. Where the conductor extends along the entire length of the hose, it may be easily grounded through its attachment to the insulation blower, which is usually at ground potential. In addition, a conductor along the entire length is preferred because the insulation material can never become charged, as it is immediately discharged through the conductive hose to the ground. In the less preferred two piece construction, static can build up in the non-conductive portion, which will lead to increased friction to the flow. The conductive portion must then be of sufficient length in ensure that any static charge is dissipated before it leaves the output end of the hose.

The conductive portion of the hose must be grounded in order to effectively dissipate the static charges. The ground is most conveniently provided through the attachment 124 to the blowing apparatus 100, which is usually of metal construction where the hose is attached and is ground potential. A ground may also be easily provided by running a conductor from the hose to an attachment on a grounded object, such as metal plumbing. The ground may also be attached at any point along the conduction path of the hose. This is less preferred, because the ground attachment must be moved with the hose as it is moved and dragged through installation spaces.

EXAMPLE OF THE PRIOR-ART

As a test, standard cellulose loose file insulation material was blown through a non-conducting plastic hose according to practice of the prior-art. The hose was 3 inches in diameter and 100 feet long and was constructed in a conventional manner from a non-conductive plastic material. During installation, the insulation material scattered widely as it exited the hose, creating a considerable dust problem that materially obscured observation of the installation. The operator experienced a number of bad static electric shocks whenever he touched a grounded surface. The insulation material was applied to an average depth of 10 inches, at a rate of about 2800 pounds per hour.

The blown density was 1.55 pounds per cubic foot. After 12 months the material settled to a stabilized matrix with a density of 1.8 pounds per cubic foot, with most of the settling occurring during the first 60 days. The increase in density was about 16%, with a decrease in the insulation depth and decrease of insulative ability of a corresponding amount. Considerable insulation material was also adhering to wooden structural members.

EXAMPLE OF THE INVENTION

The same insulation material was applied by blowing according to the method of the invention. The equipment was essentially the same as in the previous example, except the hose was of a conductive material grounded to the blower. The hose was the same dimension as the conventional plastic hose and comprised a polyethylene helical frame supporting in its interior a film hose of conductive carbon impregnated plastic. During installation of the insulation, there was little dust and application of the insulation material was readily observable, which made it easier to control the application. The operator experienced no shocks, even when he touched a grounded surface. The flow rate the insulation through the hose was 3200 pounds per hour, an increase of 15% over the flow rate in the prior-art example.

The blown density was about 1.65 pounds per cubic foot, which settled over the same time to a settled density of 1.8 pounds per cubic foot. The increase in density was only about 9%. The settling amount was decreased by about 40% as compared to the comparative prior-art example.

Similar comparative tests or the prior-art and the invention were repeated with essentially the same results. It is well know in the industry that cellulose loose-fill insulation will settle over time as much as 20%. By practice of the invention the total settling over time was reduced by as much as 40%, the application rate was increased by as much as 15%, dust was substantially reduced, and the fiber didn't scatter when exiting the hose and it is not attracted to framing members.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. An apparatus for blowing insulation material into a selected space which comprises;

blower for creating a stream of air, feeder associated with the blower for controllably metering insulation material from a hopper to entrain the insulation material into the stream of air, a flexible hose attached to the feeder/blower combination at a proximate end through which the stream of air carrying the insulating material is directed and exits through a distal outlet end of the hose, the hose comprising a grounded conductor disposed at or near the outlet end to dissipate electrical charge in the insulating material carried by the air stream and provide an essentially static-free stream of air-blown insulation material leaving the distal end the flexible hose comprising a flexible frame in the form of a helix and a flexible film hose of an electrically conductive plastic supported by the frame.

2. An apparatus as in claim 1 wherein the electrically conductive plastic is plastic impregnated with carbon or metal powder, or plastic imbedded with metal or carbon strands, fibers, or wires.

3. An apparatus as in claim 1 wherein the film hose is supported by the inner circumference of the helix and the outer diameter of the helix is sufficient to prevent edges of folds in the film from extending past the outer circumference of the helix when the hose is bent to its minimum radius.

* * * * *